United States Patent [19]

Simonetti

[11] Patent Number: 4,659,003

[45] Date of Patent: Apr. 21, 1987

[54] HEATING DEVICE FOR GENERATING A WAVE OF SOLDER IN A WAVE SOLDERING MACHINE

[75] Inventor: Jean-Pierre Simonetti, Gif-sur-Yvette, France

[73] Assignee: Outillages Scientifiques et de Laboratoires O.S.L. S.A., Carros, France

[21] Appl. No.: 798,171

[22] Filed: Nov. 14, 1985

[30] Foreign Application Priority Data

Nov. 15, 1984 [FR] France .................................. 84 17449

[51] Int. Cl.⁴ .................................................. B23K 1/08
[52] U.S. Cl. .......................................... 228/8; 228/9; 228/37; 118/667; 219/288; 219/289; 219/381; 219/382
[58] Field of Search ................. 228/8, 9, 37; 118/667; 219/85 H, 282, 298, 299, 381, 382

[56] References Cited

U.S. PATENT DOCUMENTS

| 2,869,497 | 1/1959 | Lehner | 228/37 |
| 3,680,762 | 8/1972 | Kondo | 228/37 |
| 3,797,724 | 3/1974 | Flury et al. | 228/37 |

FOREIGN PATENT DOCUMENTS 0118091 2/1984 European Pat. Off.

| 7345 | 1/1977 | Japan | 228/9 |
| 2009012 | 12/1978 | United Kingdom . | |
| 484053 | 12/1975 | U.S.S.R. | 228/37 |
| 897429 | 1/1981 | U.S.S.R. | 228/8 |

Primary Examiner—Nicholas P. Godici
Assistant Examiner—Samuel M. Heinrich
Attorney, Agent, or Firm—Wood, Herron & Evans

[57] ABSTRACT

The present invention relates to a device for generating a wave of solder in a wave soldering machine used for soldering components on printed circuit boards passing through the machine, said device being equipped with a nozzle comprising an elongated chamber with convergent walls and a discharge opening at its upper part, which opening extends below the displacement path of the printed circuit boards and through the entire width of said path, said nozzle, which is connected with a reservoir supplying liquid solder and equipped with heating elements, being designed to send an upwardly directed stream of solder which forms a wave, the said wave licking the lower face of the printed circuit boards and the components leads protruding therefrom. Said device is equipped, close to the opening of the nozzle, with at least one auxiliary heater capable of heating up the solder in the vicinity of the wave and to keep its temperature there to a value higher than a given value.

14 Claims, 2 Drawing Figures

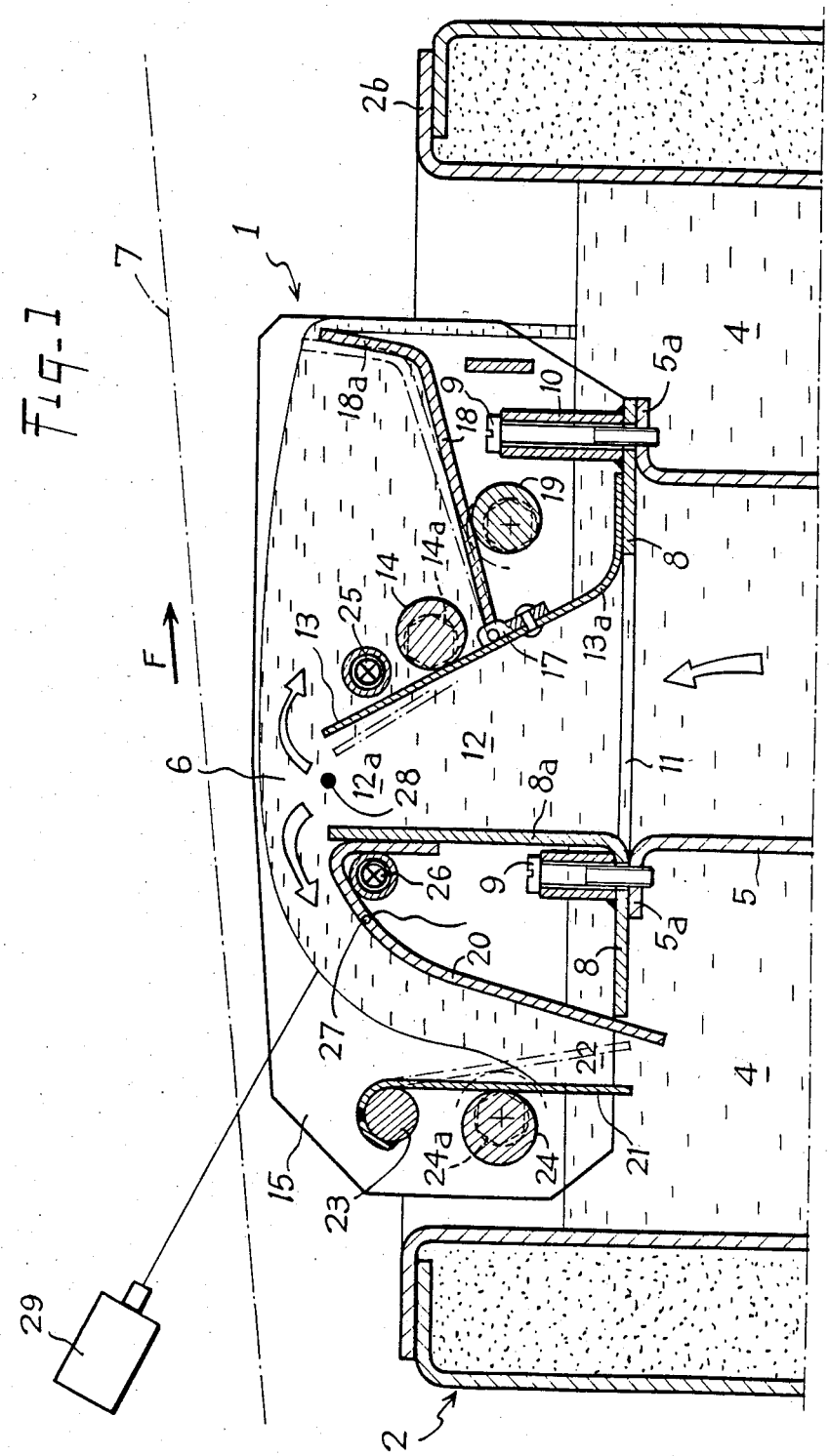

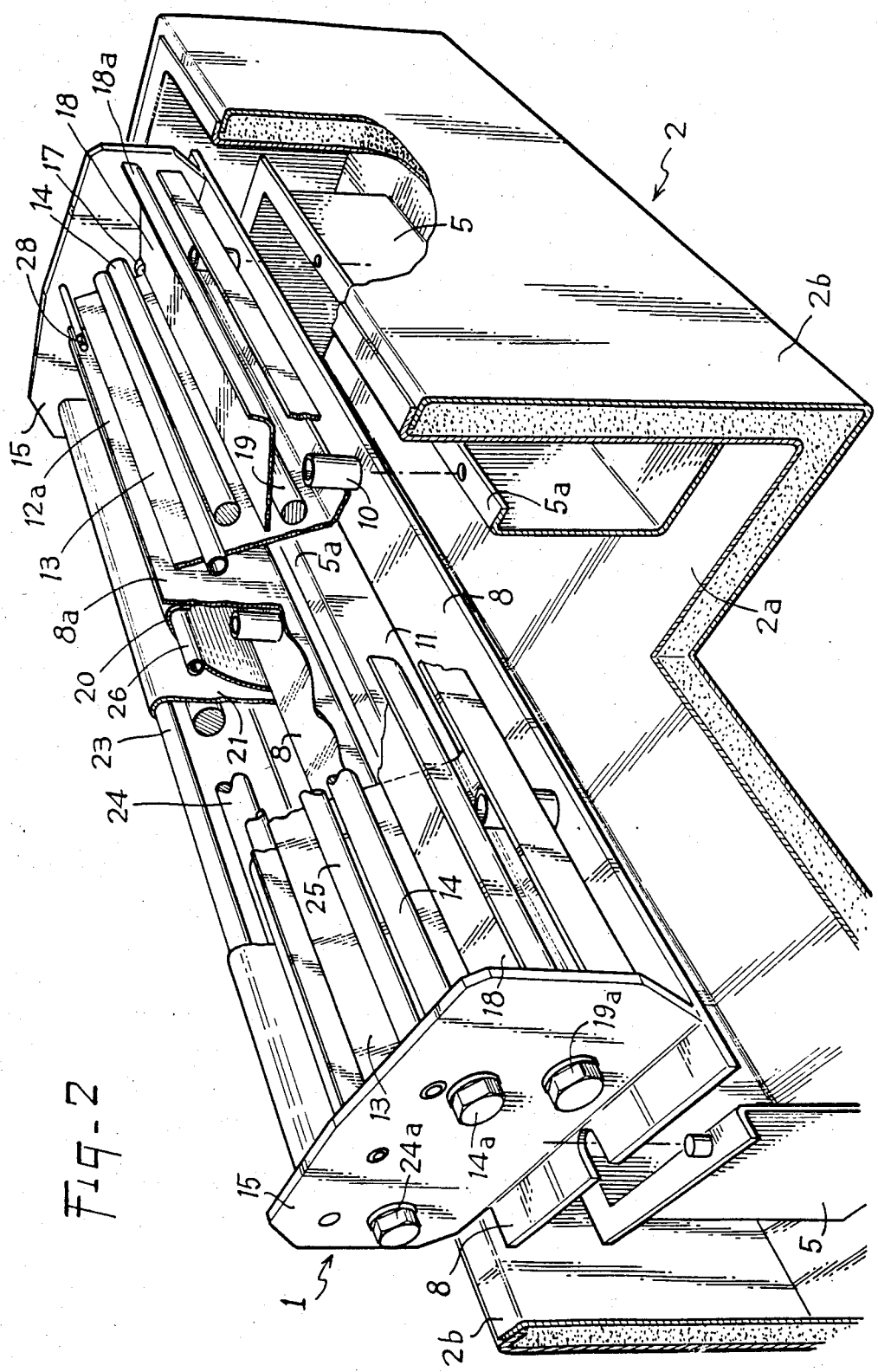

HEATING DEVICE FOR GENERATING A WAVE OF SOLDER IN A WAVE SOLDERING MACHINE

The present invention relates to a device for generating a wave of solder in a wave soldering machine used for soldering components on printed circuit boards passing through the machine, said device being equipped with a nozzle comprising an elongated chamber with convergent walls and a discharge opening at its upper part, which opening extends below the displacement path of the printed circuit boards and through the entire width of said path, said nozzle, which is connected with a reservoir supplying liquid solder and equipped with heating elements, being designed to send an upwardly directed stream of solder which forms a wave, the said wave licking the lower face of the printed circuit boards and the components leads protruding therefrom.

Owing to the many advantages offered by the dynamic wave soldering method for soldering components on printed circuit boards, said method has become increasingly important in the electronics industry. But, despite the many improvements made to the wave soldering machines, their production output is often below 100% so that the resulting products have to be thoroughly inspected for faults such as solder build-ups, unwanted bridging or on the contrary solder shortages leaving certain components unsoldered, all of which necessitate touching-ups which have to be done by hand, hence implicating time and costs.

The solder bridgings liable to affect the products are often due to a eutectic film forming on the surface of the wave when the temperature is not high enough, and which is carried by the component leads of the printed circuits leaving the wave. It should at this stage be noted that the position of the wave is remote from the reservoir containing the electrical heating elements used for melting the solder; in addition, the wave is particularly subjected to heat losses, due to its surface being directly exposed to the atmosphere and to the printed circuits, and to its being relatively thin, as well as to the high flowing speed of the solder in the wave. It is therefore conceivable that the surface of the wave can cool down as much as to reach the temperature of the eutectic point where the film begins to form.

It is the object of the present invention to avoid the formation of such a film or at least to keep the the size of the solder icicles carried by the components leads to a minimum.

To this effect, the invention proposes to equip the device, close to the opening of the nozzle, with at least one auxiliary heating element capable of heating up the solder in the vicinity of the wave and to keep its temperature there to a value higher than a given value, which latter normally corresponds to the point at which a pasty eutectic state appears (183° C. for a solder composed of 63% tin and 37% lead).

An auxiliary heating element may be disposed on the entry side of the front wall of the nozzle, viewed from the displacement direction of the printed circuit boards, and preferably along the upper edge of the front wall of the nozzle, under a guide plate guiding a stream of solder flowing out of the nozzle in the direction of the entry side.

An auxiliary heating element may also be provided on the exit side of the rear wall of the nozzle, viewed from the displacement direction of the printed circuit boards, immersed if necessary in a stream of solder flowing out of the nozzle towards the exit side. Said heating element, and, in general, every heating element incorporated to the device, will need to be equipped with a protective sleeve inside which it can be placed and wherefrom it can be removed while the solder is in molten state, for example for replacement in case of breakdown, without having to cool down the solder.

Advantageously, every heating element comprises an electrical heating resistor.

According to a preferred embodiment of the invention, the heating power of said heating element or of one at least of the heating elements of the device is servo-controlled by way of at least a heat sensor measuring the temperature of the solder close to the wave. It is possible with this particular embodiment to keep the temperature of the wave exactly to the required value, this being especially useful when using a solder of which the eutectic point is close to the temperature to which the solder must be brought for the soldering operation (for example a silver solder with a high melting point).

The device can then be equipped, with a heat sensor, comprising a heat-sensitive probe either incorporated in a sheetplate guiding the flow of solder, or placed in the stream of solder issuing from the nozzle on the entry side, substantially in the center of the nozzle discharge opening, viewed from the displacement direction of the printed circuit boards. Alternately said device can be equipped with a heat sensor comprising a infrared pyrometer pointed on the surface of the solder in the vicinity of the wave.

The invention will be more readily understood on reading the following description with reference to the accompanying drawings in which:

FIG. 1 is a cross-section through a vertical plane parallel to the displacement direction of the printed circuit boards, of a device according to the invention mounted on the solder reservoir of a wave soldering machine.

FIG. 2 shows a partly stripped perspective of the device shown in FIG. 1, mounted on top of the solder reservoir.

Referring now to the figures, these show a device 1 designed to create a wave of liquid solder in a wave soldering machine used for soldering printed circuit boards. Said device constitutes a unit assembly which is mounted on a reservoir 2 supplying liquid solder. Said reservoir 2, of which the base 2a and walls 2b are heat-insulated, is equipped, in known manner, with heating electrical elements (not shown) used for melting the mass of solder 4 contained therein, and with a pump (likewise not shown) for delivering the liquid solder with a predetermined flowrate, via a pipe 5, towards device 1. Said latter, being thus supplied, generates a wave of solder 6 which licks the underneath part of the printed circuits moving above device 1, in the direction of arrow F, following a slightly climbing rectilinear path 7. The solder, spreading over the metallized parts of the printed circuits and the components leads already in position on said boards, solder these together. The device 1 and its supply pipe 5 extend, transversely to the displacement direction of the printed circuits, through the whole width of the path followed by said boards.

The device 1 comprises a base plate 8 which is fixed on an upper edge 5a of the pipe 5 by means of screws 9 insertable in tubular sleeves 10 welded to said plate. Said latter, bordered by two flange plates 15, is provided through nearly all its length, with a wide opening 11, the corresponding part 8a of the plate being bent upwardly at 90° to form one of the walls of a convergent nozzle 12 of which the other wall is constituted by a slanting and resiliently flexible plate 13, welded to plate 8, and the angular position of which, about its incurved zone 13a, is adjustable by means of a rotary cam 14 equipped with an hexagonal actuating head 14a. Said adjustment enables the narrowing to a more or less extent of the flowing section of the opening 12a of the nozzle 12.

A tray 18 is hinged, by means of members 17, on the rear wall 13 of the nozzle 12, said tray extending on the exit side of the nozzle while resting on a cam 19, and ending into a turned-up edge 18a. Tray 18 receives part of the solder which formed the wave 6, the said stream of solder being directed towards the exit side and flowing over the turned-up edge 18a and down into the reservoir 2. By operating an hexagonal head 19a provided at one end of the cam 19, it is possible to vary the level of the flowing-over upper rim of edge 18a, varying as a result the speed of said partial flow of solder.

The major part of the solder issued from the wave 6 flows towards the entry side over plate 20 incurved so as to have a convex outline and welded to the upper edge of the front wall of the nozzle. Opposite said fixed plate 20, there is provided a substantially vertical flap 21, made of a resiliently flexible sheet, forming with said fixed plate, a space 22 receiving the stream of solder. In order to vary the flowing speed of the latter, the said space is adjustable by directionally varying the position of the flap 21 about a fixed support pin 23 force-fitted in the flange plates 15, by means of a cam 24 which is actuatable in rotation by an hexagonal end head 24a, situated near the heads 14a and 19a of the other two cams.

The device 1 is further equipped with two auxiliary heating elements 25, 26 which extend between flange plates 15 close to the opening 12a of the nozzle. The object of said heating elements is to heat up the solder in the vicinity of the wave 6 where it is subjected to great losses of heat.

Heating element 25 is placed on the exit side of the nozzle 12, inside the stream of solder flowing over the rim 18a of the tray 18. Heating element 26 is placed on the entry side of the nozzle, under incurved plate 20 guiding the main flow of solder issued from the wave 6. Said second heating element is not, therefore, immersed in the liquid solder.

Every heating element 25, 26 comprises an electric resistor removably housed in a tight sleeve which extends from one flange plate 15 to the other. Hence removal and fitting in of an electric resistor is readily possible, even when the device 1 is operative and when the liquid solder is flowing therethrough to form the wave 6.

The effective temperature of the solder in the wave region may be sensed by means of a measuring sensor, in order to regulate said temperature via a servo-control circuit controlling, by comparing the measured temperature with a set value, the electrical supply to the heating elements 25, 26. As heat measuring sensor, it is possible to use either an oblong thermometric probe 27, housed in a narrow duct made in the thickness of the plate 20, through one end of said plate to the other, or a punctual thermometric probe 28, placed inside the climbing flow of solder, substantially in the center of the opening 12a and close to one of flange plates 15, or else an infrared pyrometer 29 pointed on the surface of the solder on the entry side of the wave 6.

What is claimed is:

1. Apparatus for generating a wave of solder in a wave soldering machine used for soldering components on printed circuit boards passing continuously through the machine, said apparatus having a nozzle comprising an elongated chamber with convergent walls, and a discharge opening at its upper part, which opening extends below the displacement path of the printed circuit boards, and through the width of said path, said nozzle, being operably connected with a reservoir supplying liquid solder, and being operable to project an upwardly directed stream of solder which forms a wave, said wave licking the lower face of the printed circuit boards and the component leads protruding therefrom, wherein said apparatus is equipped, proximate the opening of the nozzle, with at least one auxiliary heating element capable of heating up the solder in the vicinity of the wave and to keep its temperature there to a value higher than a given value.

2. Apparatus as claimed in claim 1, wherein said apparatus comprises an auxiliary heating element placed on the entry side of the front wall of the nozzle viewed from the displacement direction of the printed circuit boards.

3. Apparatus as claimed in claim 2, wherein said auxiliary heating element is disposed along the upper edge of the front wall of the nozzle, under a guide sheet guiding a stream of solder flowing out of the nozzle in the direction of the entry side.

4. Apparatus as claimed in claim 1, wherein said device comprises a second auxiliary heating element placed on the exit side of the rear wall of the nozzle viewed from the displacement direction of the printed circuit boards.

5. Apparatus as claimed in claim 4, wherein said second heating element is immersed in a stream of solder flowing out of the nozzle towards the exit side.

6. Apparatus as claimed in claim 1, wherein each heating element is provided with a protective sleeve in which it can be inserted and wherefrom it can be removed while the solder is in molten state.

7. Apparatus as claimed in claim 1, wherein each heating element comprises an electrical heating resistor.

8. Apparatus as claimed in claim 1, wherein the heating power of the heating element or of at least one of the heating elements is servo-controlled with at least a thermometric sensor measuring the temperature of the solder in the vicinity of the wave.

9. Apparatus as claimed in claim 8, wherein said device is equipped, as thermometric sensor, with a heat-sensitive probe incorporated in a sheet guiding the flow of solder.

10. Apparatus as claimed in claim 8, wherein said device is equipped, as thermometric sensor, with a heat-sensitive probe placed in the climbing stream of solder issued from the opening of the nozzle, substantially in the center of said opening.

11. Apparatus as claimed in claim 8, wherein said device is equipped, as thermometric sensor, with an infrared pyrometer pointed on the surface of the solder in the vicinity of the wave.

12. Apparatus for soldering components on printed circuit boards moving in a path extending through entry and exit sides of a solder wave, said apparatus comprising:
a heated solder reservoir;

a nozzle operably connected to said reservoir and having an upwardly directed opening for generating a solid wave of solder from heated solder flowing through the nozzle from the reservoir;

said opening extending to a disposition below said path and across the width thereof such that a solder wave issuing therefrom licks the circuit boards and component leads extending therefrom;

said wave flowing from said nozzle opening in two opposite directions on both entry and exit sides thereof; and auxiliary heating means disposed proximate said wave adjacent an entry side of said nozzle for heating solder in said wave to a temperature sufficiently high enough to prevent the formation of an eutectic film on said wave.

13. Apparatus as in claim 12, further including temperature sensing means for sensing the temperature of solder in said wave and for controlling said auxiliary heating means in response to said sensing.

14. Apparatus as in claim 13, further including a second auxiliary heating means disposed in a path of said solder flowing away from said nozzle opening on an exit side thereof for heating solder in said wave to a temperature sufficiently high enough to prevent the formation of an eutectic film on said wave.

* * * * *